US009607451B2

(12) United States Patent
Mouterde

(10) Patent No.: US 9,607,451 B2
(45) Date of Patent: Mar. 28, 2017

(54) METHOD AND A SYSTEM FOR MERGING HEALTH INDICATORS OF A DEVICE

(71) Applicant: AIRBUS HELICOPTERS, Marignane (FR)

(72) Inventor: Joel Mouterde, Marseilles (FR)

(73) Assignee: Airbus Helicopters, Marignane (FR)

( * ) Notice: Subject to any disclaimer, the term of this patent is extended or adjusted under 35 U.S.C. 154(b) by 0 days.

(21) Appl. No.: 14/793,957

(22) Filed: Jul. 8, 2015

(65) Prior Publication Data

US 2016/0012651 A1  Jan. 14, 2016

(30) Foreign Application Priority Data

Jul. 10, 2014  (FR) ...................................... 14 01544

(51) Int. Cl.
G07C 5/08 (2006.01)
G05B 23/02 (2006.01)

(52) U.S. Cl.
CPC ............. *G07C 5/08* (2013.01); *G05B 23/024* (2013.01); *G05B 23/0235* (2013.01)

(58) Field of Classification Search
CPC ..... G07C 5/08; G05B 23/0235; G05B 23/024
See application file for complete search history.

(56) References Cited

U.S. PATENT DOCUMENTS 6,564,119 B1  5/2003  Vaculik et al.
7,027,953 B2 *  4/2006  Klein ..................... G01H 1/006
702/182

(Continued)

FOREIGN PATENT DOCUMENTS

EP 2204778 A2 7/2010
EP 2204778 A3 12/2011
FR 2972025 8/2012

OTHER PUBLICATIONS

French Search Report for French Application No. 1401544, Completed by the French Patent Office on Feb. 26, 2015, 13 Pages.

*Primary Examiner* — Thomas Tarcza
*Assistant Examiner* — Michael Berns
(74) *Attorney, Agent, or Firm* — Brooks Kushman P.C.

(57) ABSTRACT

A method and system for merging health indicators of a device. During the method, health indicators $Ind_i$ are firstly distributed in at least one indicator group G, each health indicator $Ind_i$ being associated with a respective detection threshold $Sd_i$, it being possible to determine a characteristic operating point of the device by using the health indicators $Ind_i$ of an indicator group G. An alarm threshold Sa is determined using training health indicators. Then, a merged health indicator MHI is determined by taking into account both of the alarm threshold Sa and also of the detection thresholds $Sd_i$ of the health indicators $Ind_i$ of the group G. Finally, the merged health indicator MHI is compared to the alarm threshold Sa and it is deduced whether or not the device presents a fault or a risk of such a fault appearing.

20 Claims, 3 Drawing Sheets

(56) References Cited

U.S. PATENT DOCUMENTS

| | | | |
|---|---|---|---|
| 7,882,394 B2 * | 2/2011 | Hosek | G05B 23/0235 |
| | | | 702/184 |
| 8,356,207 B2 * | 1/2013 | Hosek | G05B 23/0235 |
| | | | 702/184 |
| 8,803,461 B2 * | 8/2014 | Tiwari | H02P 25/024 |
| | | | 318/459 |
| 8,868,287 B2 | 10/2014 | Delaye et al. | |
| 9,157,832 B2 * | 10/2015 | Uluyol | G01M 13/045 |
| 2005/0096873 A1 | 5/2005 | Klein | |
| 2008/0082299 A1 | 4/2008 | Samardzija et al. | |
| 2008/0208487 A1 | 8/2008 | Goebel et al. | |
| 2009/0281735 A1 | 11/2009 | Bechhoefer | |
| 2011/0173496 A1 | 7/2011 | Hosek et al. | |
| 2014/0149325 A1 | 5/2014 | Clifton et al. | |

* cited by examiner

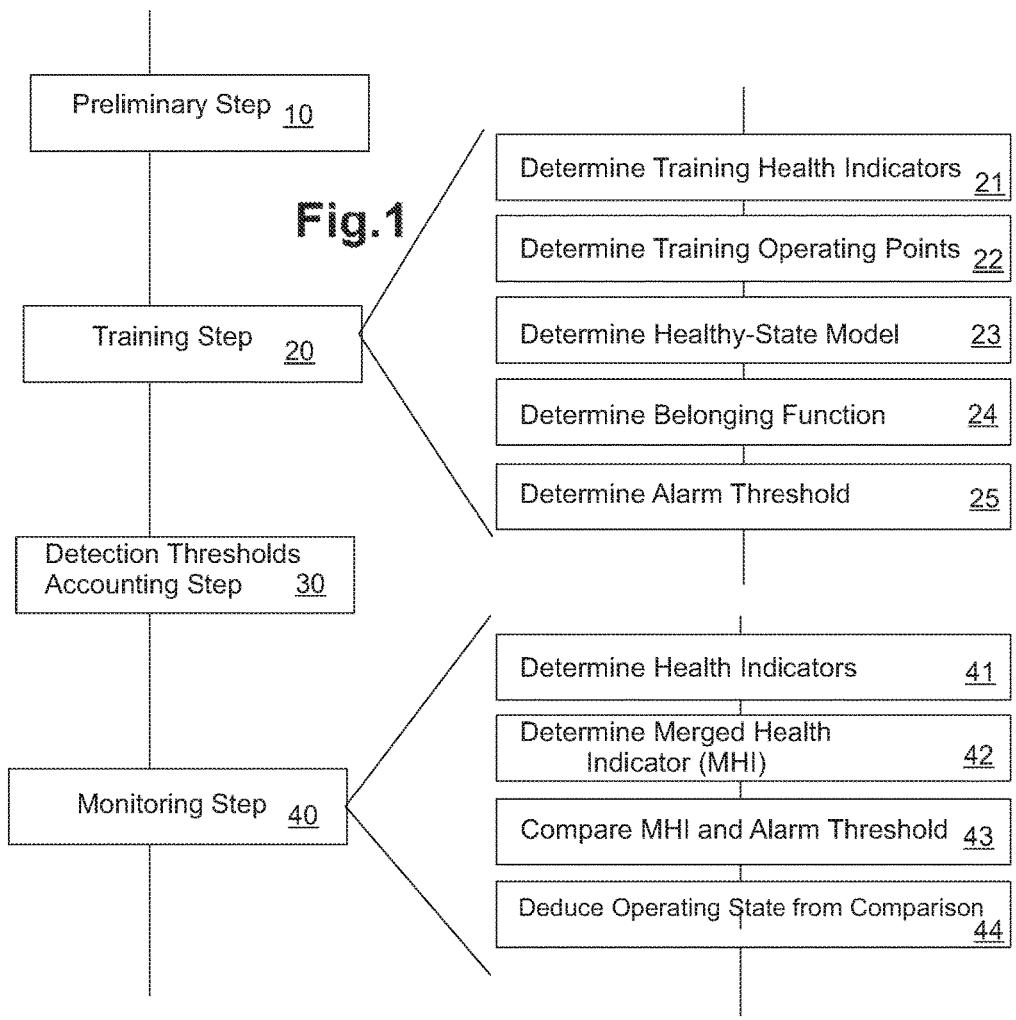
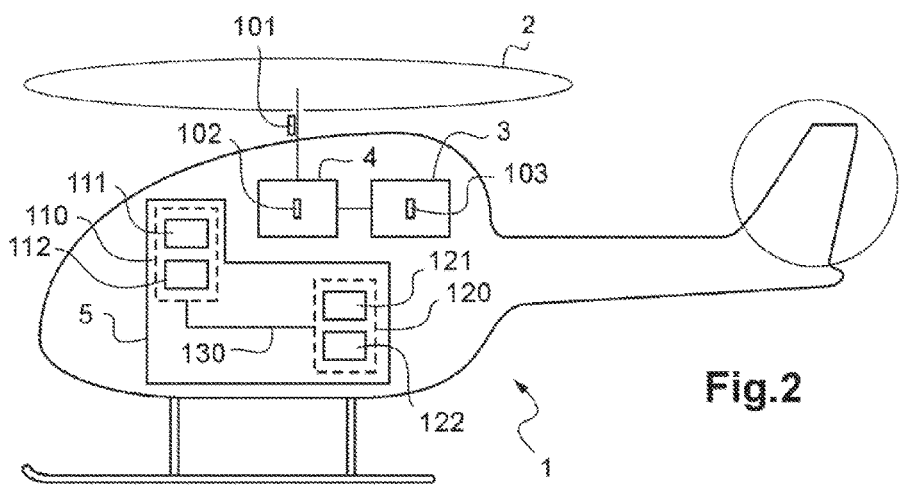

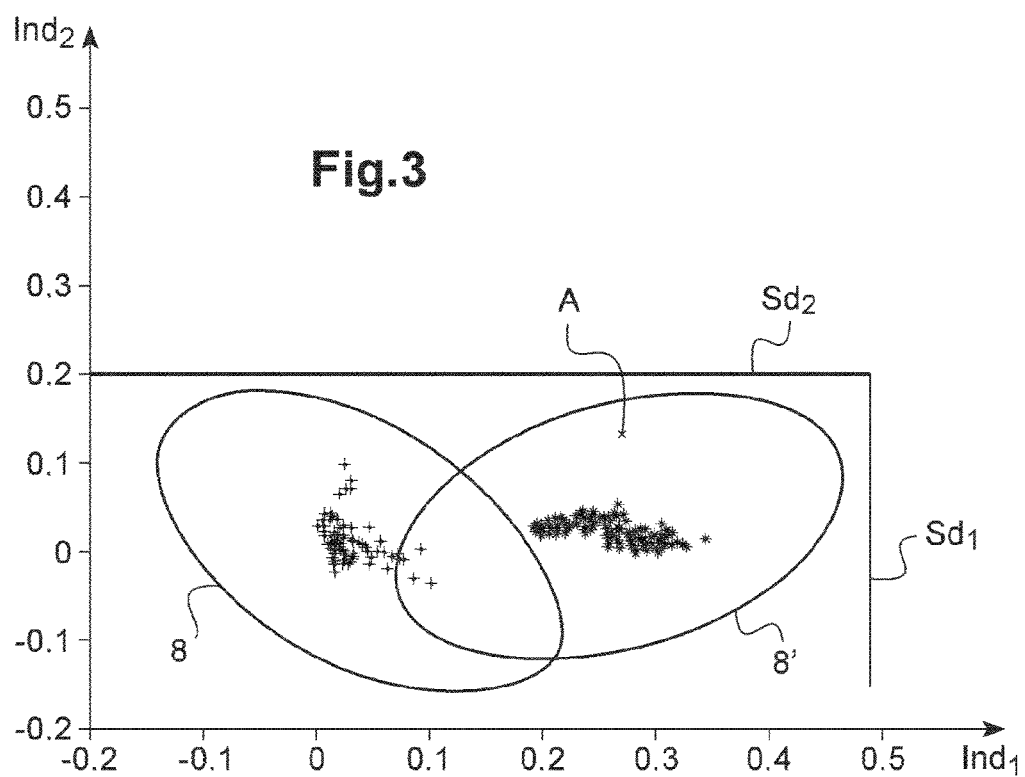
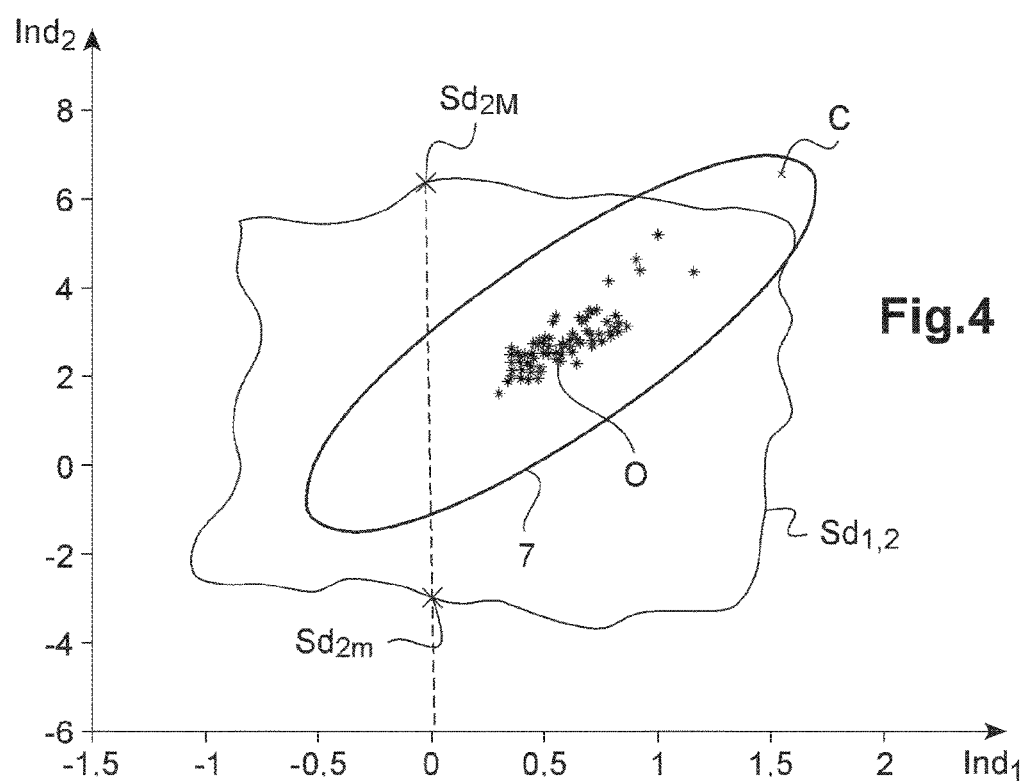

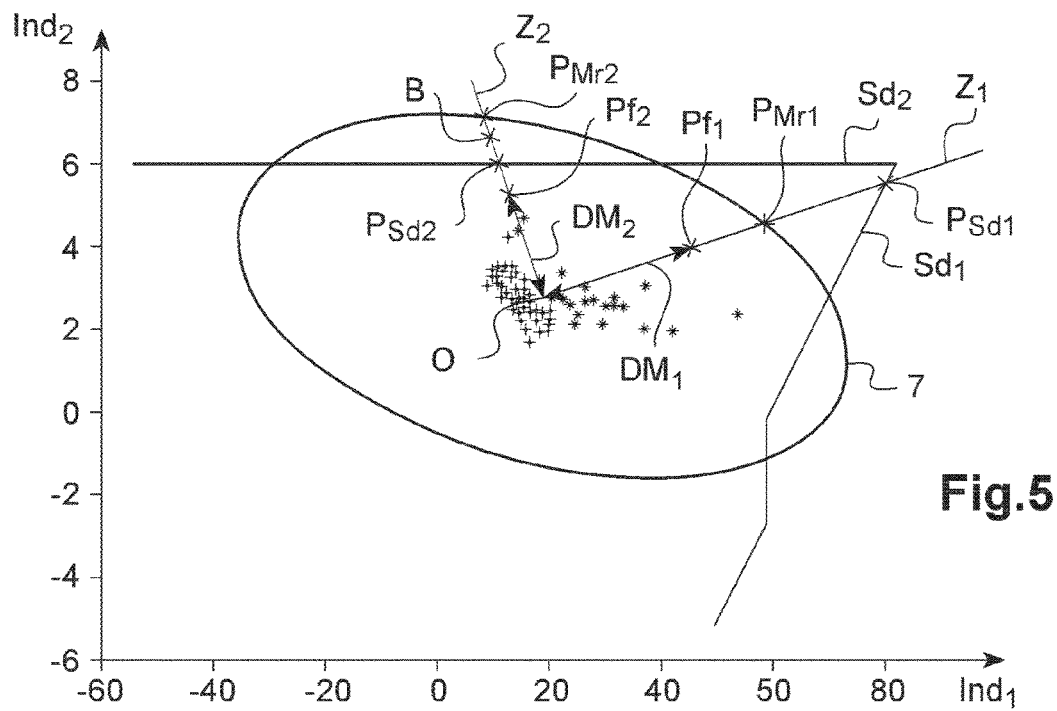
Fig.5
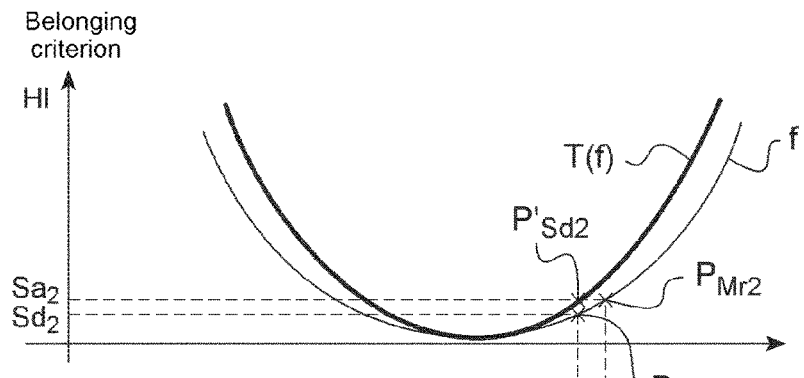
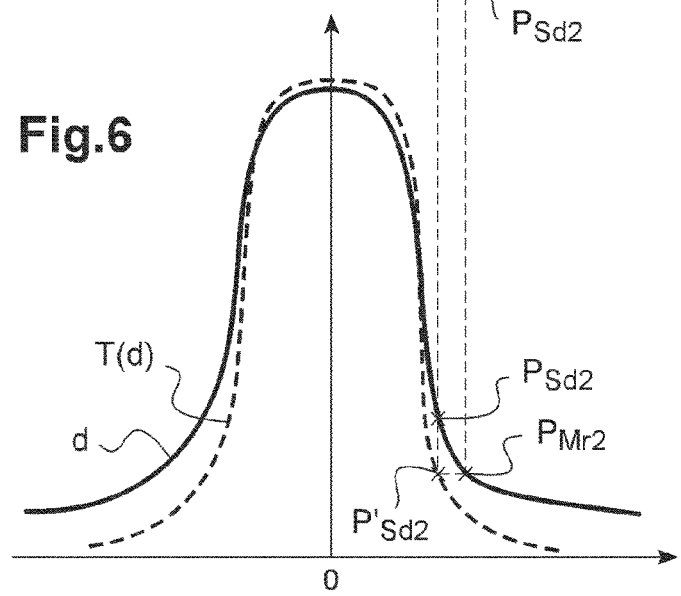
Fig.6

METHOD AND A SYSTEM FOR MERGING HEALTH INDICATORS OF A DEVICE

CROSS REFERENCE TO RELATED APPLICATION

This application claims priority to French patent application No. FR 14 01544 filed on Jul. 10, 2014, the disclosure of which is incorporated in its entirety by reference herein.

BACKGROUND OF THE INVENTION (1) Field of the Invention

The present invention relates to the field of monitoring the operation of a device. The present invention relates in particular to a method of merging health indicators of a device and to means for implementing said method.

The present invention is more particularly designed for monitoring the operation of a rotary wing aircraft and of various devices included therein. By way of example, the method of the invention applies to monitoring a mechanical power transmission mechanism inserted between at least one fuel-burning engine and at least one rotor of said aircraft, or indeed to monitoring a fuel-burning engine.

(2) Description of Related Art

Monitoring and detecting the presence of a fault within a device and also of the risk of such a fault appearing is the topic of a large amount of research.

In particular, the monitoring systems referred to as Health and Usage Monitoring System(s) (HUMS) aim to monitor one or more generally dynamic devices by means of various sensors tracking variations in a set of health indicators. These health indicators are activated on the basis of measurements from one or more sensors so as to characterize the state and the operation of each device. By way of example, a health indicator may be defined by a signal combining the signals from a plurality of sensors. A plurality of health indicators may also involve the measurements from a single sensor by using various different characteristics of the signal provided by said sensor, such as its frequency spectrum or also a time-varying signal. By way of example, a health indicator is constituted by the maximum amplitude of a time-varying signal provided by an accelerometer.

The variation of each health indicator is compared respectively to a fault detection threshold corresponding to said health indicator so as to detect the possible presence of a fault or a failure of the monitored device or indeed so as to detect a risk of such a fault or of such a failure appearing. The value for each fault detection threshold may be determined by experiment, by statistical analysis on the operation of a fleet of a particular type of aircraft with a given health and usage monitoring system (HUMS), or else by individual training on a given aircraft.

Such a fault detection threshold is generally a minimum threshold or a maximum threshold. If it is a maximum threshold, then so long as the health indicator remains below said maximum threshold, no presence or risk of a fault or a failure appearing is detected. However, when the health indicator is greater than or equal to said maximum threshold, then the presence or a risk of a fault or a failure appearing is detected. Conversely, if it is a minimum threshold, then so long as the health indicator remains above said minimum threshold, no presence or risk of a fault or a failure appearing is detected. However, when the health indicator is less than or equal to said minimum threshold, then the presence or a risk of a fault appearing or of a failure appearing is detected.

In the description below, it is assumed for simplification purposes that a fault detection threshold is a maximum threshold.

This fault detection threshold may be a constant value, but it could also vary depending on various parameters, which parameters possibly include at least one other health indicator of the monitored device.

This fault detection threshold may also be a double threshold made up of a lower limit and an upper limit, thus constituting a range. The presence of a fault is thus generally detected when the health indicator is found outside the range.

In addition, a fault detection threshold may also vary as a function of time during the operation of the monitored device.

By way of example, a fault detection threshold may be calculated by using a history of the operation of the monitored device, said history being determined during a training period while the device is healthy, and such a threshold then being referred to as a "learned threshold". During said training period, the fault detection threshold is equal to a predetermined constant value, the learned threshold subsequently being bounded by said predetermined constant value.

A fault detection threshold may also be a moving threshold, which is determined over a first time period and which is used over a second time period, said moving threshold thus potentially varying over the entire duration of operation of the monitored device.

By way of example, document US2005/0096873 describes a method of diagnosing a mechanical system using vibration analysis. That method processes vibration signals over a wide band of frequencies coming from various sensors. Those signals are then compared with signals including known faults so as to determine the current state of the mechanical system. In addition, the vibratory signals may be combined with operational information such as component temperatures or indeed the frequency of rotation of a motion transmission shaft, for example.

Document FR 2 972 025 is also known, which describes a method of predicting maintenance operations on an aircraft engine. That method uses a database containing feedback about the causes of the failures of such engines and about the levels of intervention required in order to repair them. That database also contains data about said engines such as the type of engine, and its degree of aging, for example. A statistical failure model modeling the causes of failure and adapted to each type of engine may thus be defined and characterized by a curve plotting the cumulative probability of failure as a function of time. That curve is based on Weibull's distribution law, and decision rules concerning levels of intervention are associated with that failure model as a function of parameters relating to each engine.

In addition, document US2009/0281735 describes a method of determining a future time for performing a maintenance operation on a component or on a subsystem. That future time is defined using a state indicator that is determined at a given instant and using a material value that is determined using a rate of change of that state indicator over a period of time. That future time may be defined by a number of cycles to be carried out before performing a maintenance operation.

In addition, document US2011/0173496 describes a diagnostic method during which a database is defined using history data of selected variables for one or more components. Then, specific characteristics are calculated using said database and hypotheses about the operating states of said components are determined by evaluating said specific characteristics. Finally, an existing state of each component is defined for each hypothesis and possible preventative maintenance operations are deduced.

In addition, the prior art in the field of monitoring operation of a device includes the following documents US2008/0082299, EP 2 204 778, U.S. Pat. No. 6,564,119, and US2014/0149325.

Such monitoring systems thus make it possible to keep the deterioration processes of mechanical assemblies under control by monitoring their operating states in real time so as to anticipate and detect possible faults or failures. Implementing such a monitoring system makes it possible to keep the risks of a technical failure appearing during flight under control and to postpone or to anticipate maintenance tasks. In this way, maintenance costs can be reduced and equipment availability for the client can be increased.

However, the health indicators need to be numerous, of the order of several hundreds, in order to monitor in effective and reliable manner an entire vehicle such as a rotary wing aircraft. Thus, it may be complex for an operator to track those health indicators.

In order to facilitate the work of the operator and in order to improve its effectiveness, a plurality of health indicators may be merged in order to form a merged health indicator, referenced "MHI".

Several methods for merging health indicators have been developed. By way of example, health indicators associated with a particular component or with a particular mechanical subsystem are grouped together into an indicator group. Each indicator group thus makes it possible to calculate a merged health indicator MHI. This merged health indicator MHI is then compared with an alarm threshold and thus makes it possible to detect an abnormal behavior of said component or of said mechanical substation. By way of example, such a mechanical subsystem may be an engine, or a mechanical or an electrical power transmission mechanism.

Such merging methods provide two main advantages in the field of monitoring the operation of a device. Firstly, the number of health indicators tracked by an operator is reduced, e.g. from several hundreds of health indicators to a few tens of merged health indicators MHI for an entire vehicle. Furthermore, detection performance is improved because additional information is obtained by correlation between a plurality of health indicators, where such additional information cannot be obtained by analyzing health indicators individually and independently.

In general, such merging methods use a training period during which health indicator values are collected while the monitored element is healthy and is operating correctly. A cloud of operating points represented by the health indicator values may then be modeled in a health indicator space in order to represent the healthy state of said element and thus make it possible to determine a healthy-state model for said element. A merged health indicator MHI may be defined in order to represent the position of any operating point in said health indicator space relative to said model for said element. Said merged health indicator MHI may, for example, be characterized by a distance between said operating point and the center of said model for said element. Such a merged health indicator MHI may then be compared with an alarm threshold Sa equal to the distance between said center and the boundary of said model representing said healthy state of said element.

By way of example, document US 2008/0208487 describes a method of estimating the lifetime remaining for a component for a subsystem by merging a plurality of models for determining said remaining lifetime. That method makes it possible to combine the results of those methods with redundant information from those models in order to improve the accuracy and reliability of the estimated lifetime remaining for the component or the subsystem.

In spite of the above-mentioned improvements, such merging methods alone do not make it possible to guarantee that they will detect all of the events that would be detected by a traditional monitoring method in which the health indicators are compared independently and individually with their respective thresholds. Indeed, the healthy-state model for said element as determined by such a merging method may cover a zone in the health indicator space that goes beyond the fault detection threshold(s) for one or more health indicators, thus failing to set off an alarm when said fault detection threshold is crossed.

It is then necessary to impose additional constraints on the merging method in order to remove those risks of non-detection, but those additional constraints may then generate a high rate of false alarms.

It is also possible to combine a comparison between the merged health indicator MHI and its alarm threshold with a comparison between one or more health indicators and their respective fault detection thresholds. However, such a technique is thus more complex than comparing each health indicator individually with its respective fault detection threshold. In addition, such a technique presents several disadvantages, in particular firstly possible inconsistencies between the alarms based on the health indicators and the alarms based on the merged health indicator MHI and secondly the need for continuing to monitor the health indicators individually.

BRIEF SUMMARY OF THE INVENTION

The present invention thus aims to provide a method and a system for merging health indicators of a device, making it possible to overcome the above-mentioned limitations. The present invention is designed for monitoring one or more devices, and possibly also a group of devices and more particularly for monitoring the operation of devices on-board a rotary wing aircraft.

According to the invention, a method of merging health indicators of a device is designed for monitoring said device and more particularly for monitoring its operation by combining the use of detection thresholds corresponding to health indicators and an alarm threshold corresponding to merging health indicators.

Measurement sensors are positioned on said device and/or close to said device, measurements of at least one of said sensors making it possible to determine at least one health indicator $Ind_i$, each health indicator $Ind_i$ being associated with a respective detection threshold $Sd_i$.

In said method of merging health indicators of a device:
during a preliminary step, the health indicators $Ind_i$ of the device are distributed in at least one indicator group G, an algorithm g being applied to the health indicators $Ind_i$ of an indicator group G in order to determine a characteristic operating point Pf of the device for the indicator group G;
during a training step, there are determined: a healthy-state model Mr for the device; a belonging function f indicating whether a characteristic operating point Pf of the device belongs to the healthy-state model Mr for the device for the indicator group G; and an alarm threshold Sa associated with the belonging function f based on the training operating points;

during a step of taking account of the detection thresholds $Sd_i$, a transformation T of the belonging function f is determined so as to take into account, firstly, the alarm threshold Sa of the healthy-state model Mr and secondly, the detection thresholds $Sd_i$ of the health indicators $Ind_i$ of the group G; and during a monitoring step the following steps are performed:

determining the health indicators $Ind_i$ of an indicator group G;

determining the merged health indicator MHI by applying the transformation T of the belonging function f to the health indicators $Ind_i$ of an indicator group G of the device;

comparing the merged health indicator MHI with said alarm threshold Sa; and deducing an operating state of the device.

The health indicators make it possible to monitor one or more devices, or even a group of devices, by means of various sensors positioned on one or more devices and/or near said device(s).

As mentioned above, the health indicators necessary for monitoring a device correctly may be high in number. It may thus be advantageous to reduce the number of health indicators that an operator must track in order to facilitate the task of monitoring and to improve its effectiveness.

Initially, the health indicators are distributed in various indicator groups during a preliminary step in order to make it possible to calculate a characteristic operating point Pf for a device or a group of devices. Each indicator group is thus associated with the device or the group of monitored devices. Moreover, any one health indicator may be included in a plurality of indicator groups.

The characteristic operating point Pf for an indicator group is determined by subjecting the health indicators of said indicator group to a predefined algorithm specific to that indicator group. This characteristic operating point Pf then makes it possible to characterize said device or said group of devices and, consequently, to define an operating state of said device or of said group of devices. In this manner, it is possible to detect the presence of a fault or of a failure, or the risk of such a failure appearing.

By way of example, such an algorithm g making it possible to determine the characteristic operating point Pf using health indicators is an algorithm for standardizing the data from said health indicators.

Such devices may be fitted to a rotary wing aircraft and be made up for example of a mechanical power transmission mechanism or an engine. Each indicator group is generally determined when designing the device or the rotary wing aircraft including the device. Each indicator group may also be determined on an existing device or on an existing aircraft, using the health indicators of said device or of said aircraft.

The health indicators of a device may be calculated while the device is in operation or after a stage of operation of said device. In addition, when the monitored device is part of a rotary wing aircraft, the health indicators of said device may be calculated during a flight of the aircraft or after a flight of the aircraft.

By way of example, the health indicators are calculated after a flight of the aircraft and on the ground by means of one or more computers outside the aircraft.

Each health indicator is determined using measurements of one or more sensors. Each health indicator is thus represented by a signal that may be continuous, i.e. analog, or discretized, i.e. digital.

By way of example, in order to calculate each health indicator, at least one measurement is acquired from one or more sensors positioned on a device or close to said device. By way of example, measurements from said sensor(s) constitute a signal corresponding to a vibratory signal, an audible signal, a temperature, or a pressure.

Moreover, a fault detection threshold is associated with each health indicator. As mentioned above, it is considered herein that this detection threshold is a maximum threshold, although it could also be a minimum threshold or a double threshold forming a range.

Then, during a training step, there are determined: the healthy-state model Mr for each device together with the belonging function f indicating whether a characteristic operating point Pf of the indicator group does or does not belong to said healthy-state model Mr; and also an alarm threshold Sa of the healthy-state model Mr based on training operating points.

This training step may comprise a plurality of substeps during which:

training health indicators of the indicator group G are determined for a healthy device;

training operating points of the device are determined by applying the algorithm g to the training health indicators, which algorithm has been predefined and is specific to said indicator group G;

the healthy-state model Mr for the device is determined using said training operating points of the device;

the belonging function f indicating whether a characteristic operating point Pf of the device belongs to the healthy-state model Mr for the device is determined for the indicator group by using the training operating points of said indicator group; and an alarm threshold Sa associated with the belonging function f is determined, the alarm threshold Sa being equal to a belonging criterion of a limit operating point located on a boundary of the healthy-state model Mr for the device, the belonging criterion being determined by applying the belonging function f to the health indicators corresponding to said limit characteristic operating point of the device for the indicator group.

The term "boundary of the healthy-state model Mr" should be understood as being the separation defined by the healthy-state model Mr between operating points corresponding to the absence of a fault on the monitored device and operating points corresponding to the presence of a fault or to a risk of a fault appearing on said device.

By way of example, this boundary of the healthy-state model Mr may be determined statistically.

This alarm threshold Sa thus corresponds to the limit of a characteristic operating point Pf belonging to the healthy-state model Mr for the indicator group.

The term "healthy device" usually refers to a device that is operating correctly, without the presence of a fault.

This training step is generally performed during acceptance tests on the device or on the aircraft including the monitored device, on a new device, possibly after a running-in period making it possible to verify that it operates correctly. This training step may also be carried out again after a repair or maintenance operation performed on the monitored device, or following a modification of said device or of its environment.

This training step also makes it possible to determine a set of training operating points of the device by applying the algorithm g to the health indicators of said indicator group. This set of training operating points may be represented as a cloud of training operating points of the device in a space formed by the health indicators of said indicator group.

Since this cloud is made up of training operating points that correspond to a healthy device, it can then be modeled by a healthy-state model Mr that represents the healthy state of the device in said space formed by the health indicators of said indicator group.

This healthy-state model Mr for the device may be defined by a parametric model. The term "parametric model" refers to an analytical expression that makes it possible to model said cloud.

Known parametric formulas exist, such as Gaussian distribution, Poisson distribution, or Weibull distribution. It is appropriate to apply the formula that gives the best fit to the cloud of training operating points as a function of the shape of said cloud and as a function of the distribution and the density of the training operating points in the cloud.

This healthy-state model Mr for the device may thus be modeled by a single multidimensional parametric model in the space formed by the health indicators of said indicator group providing the training operating points are regularly distributed.

A distribution is said to be "regular" when all the points are grouped together in a single cloud.

When this is not so, the cloud of training operating points can be broken down into regular subsets, the healthy-state model Mr then being modeled by superposing a plurality of multidimensional parametric models in this space. Moreover, a superposition of parametric models can generally be modeled by a single parametric model.

In any event, regardless of whether the healthy-state model Mr is formed by a single multidimensional parametric model or by a superposition of multidimensional parametric models, said multidimensional parametric model(s) has/have the same number of dimensions as there are health indicators forming the indicator group.

By way of example, the healthy-state model Mr for the device can be modeled by a single multidimensional Gaussian function or by a superposition of multidimensional Gaussian functions known as a Gaussian Mixture Model (GMM). In addition, each multidimensional Gaussian function can be weighted depending on the distribution and the density of the training operating points in said group of points.

Other techniques may also be used to model the healthy-state model Mr for the device, such as for example self-organizing maps, also known as "Kohonen" maps. These techniques make it possible to define both the healthy-state model Mr and the belonging function f.

This healthy-state model Mr for the device then makes it possible to specify that a characteristic operating point Pf of the indicator group which is located inside the boundary of said healthy-state model Mr corresponds to a healthy device without any fault, whereas a characteristic operating point Pf of the indicator group which is located outside this boundary, or on said boundary, corresponds to a device having a fault, or where there is a risk of a fault appearing.

In addition, the belonging function f makes it possible to define a belonging criterion for each characteristic operating point Pf indicating whether it belongs to the healthy-state model Mr. This belonging criterion may be a positioning criterion concerning the position of said characteristic operating point Pf relative to the healthy-state model Mr. In order to define this belonging function f, the use of statistical models is particularly appropriate since they make it rather easy to define a positioning criterion concerning the positioning of a point relative to the healthy-state model Mr.

The belonging function f is preferably applied directly to the health indicators of said indicator group so as to define the belonging criterion of the characteristic operating point Pf corresponding to said health indicators $Ind_i$. Consequently, the belonging function f contains the algorithm g making it possible to define this characteristic operating point Pf using these health indicators $Ind_i$.

However, this belonging function f may also be applied to the previously-determined characteristic operating point Pf by applying the algorithm g to the health indicators $Ind_i$ of this indicator group.

This belonging criterion may thus be compared to the alarm threshold Sa so as to determine the position of said characteristic operating point Pf relative to the boundary of said healthy-state model Mr and, consequently, whether there is a fault present on the monitored device or a risk of a fault appearing.

By way of example, since said alarm threshold Sa is a maximum threshold, if the belonging criterion corresponding to a characteristic operating point Pf is less than the alarm threshold Sa, said characteristic operating point Pf is inside the healthy-state model Mr and characterizes a healthy device presenting no fault and no risk of a fault appearing.

Conversely, if the belonging criterion corresponding to this characteristic operating point Pf is greater than or equal to the alarm threshold Sa, this characteristic operating point Pf is outside the healthy-state model Mr or on the boundary of said healthy-state model Mr and characterizes a device that is likely to present a fault or a risk of a fault appearing.

If the healthy-state model Mr is regular and a center of said healthy-state model Mr can be defined, the belonging criterion may be a distance between said characteristic operating point Pf and the center of said healthy-state model Mr, the alarm threshold Sa being the distance between said center of the healthy-state model Mr and the boundary of the healthy-state model Mr. This alarm threshold Sa may thus vary, the distance between the center and the boundary of the healthy-state model Mr generally not being constant all-around said center.

If the healthy-state model Mr is modeled by a single multidimensional Gaussian function, the Mahalanobis distance is particularly suited to defining whether or not a characteristic operating point PF belongs to the healthy-state model Mr. The belonging function f is thus a function for determining said Mahalanobis distance.

The Mahalanobis distance characterizing a point is the distance between said point and the center of the Gaussian function, while taking account of the distribution defined by said Gaussian function around said center. Thus, the Mahalanobis distance takes into account the variances and the covariances of the Gaussian function, depending on the direction defined by its center and said point. In fact, the Mahalanobis distance between the center and the boundary of the healthy-state model Mr is constant around said center, whereas the equivalent Euclidean distance between said center and the boundary of the healthy-state model Mr can vary around said center.

In the particular circumstance of said healthy-state model Mr corresponding to a model with identical distributions in each direction of the space formed by the health indicators, then the Mahalanobis distance is equal to the Euclidean distance. The distribution about the center of said healthy-state model Mr is then uniform and the alarm threshold Sa corresponding to said Euclidean distance is thus constant.

In this particular circumstance, such a uniform healthy-state model Mr is represented by a circle in a two-dimensional space formed by two health indicators, or by a sphere in a three-dimensional space formed by three health indicators.

In other circumstances, the healthy-state model Mr modeled by a single multidimensional Gaussian function is generally represented by an ellipse in a two-dimensional space formed by two health indicators.

However, if the healthy-state model Mr is a superposition of multidimensional Gaussian functions, it is difficult and complex to define a center of the healthy-state model Mr and, consequently, a distance between said center and a characteristic operating point Pf. In this situation, a belonging criterion suitable for defining the position of a characteristic operating point Pf relative to the healthy-state model Mr may be the probability density of said healthy-state model Mr. The belonging function f may thus be a function of the probability density of the healthy-state model Mr, since it is known that a bijection (one-to-one correspondence) exists between the Mahalanobis distance and the probability density for any Gaussian function.

By way of example, the belonging function f is a decreasing function of the probability density when the alarm threshold Sa is a maximum threshold, with the probability density decreasing as a characteristic operating point Pf moves away from the center of the healthy-state model Mr.

A probability density of a healthy-state model Mr and the belonging function f, which is a function of said probability density, thus make it possible to characterize each characteristic operating point Pf and in particular its position relative to a boundary of the healthy-state model Mr, characterized by the alarm threshold Sa. It can therefore be determined whether or not said characteristic operating point Pf is located inside the healthy-state model Mr.

In addition, the probability density of a superposition of multidimensional Gaussian functions may be defined by the sum of the probability densities for each multidimensional Gaussian function, said sum being renormalized depending on the characteristics of a probability density.

Consequently, a correlation exists between the probability density of each multidimensional Gaussian function and the Mahalanobis distance associated with said multidimensional Gaussian functions. It is therefore possible to define the belonging function f depending on the probability density of a superposition of multidimensional Gaussian functions.

By way of example, if the healthy-state model Mr is a superposition of p Gaussian functions in a space formed by n health indicators, then the probability density constituting the belonging function f may be defined by the formula:

$$f(X) = \sum_{k=1}^{p} \left[ \frac{A_k}{(2\pi)^{\frac{n}{2}} \cdot |C_k|^{\frac{1}{2}}} \cdot e^{-\frac{1}{2}T(X-\mu_k)(C_k)^{-1}\cdot(X-\mu_k)} \right]$$

in which p is a positive integer representing the number of Gaussian functions constituting the healthy-state model Mr, k is a positive integer varying from 1 to p representing the number of a Gaussian function, n is a positive integer representing the number of health indicators $Ind_i$ constituting the indicator group G, X is the n-dimensional vector formed by the health indicators constituting the indicator group G, such that $X=(ind_1, \ldots, ind_i, \ldots, ind_n)$, $\mu_k$ is an n-dimensional mean vector characterizing the Gaussian function k, $C_k$ is the covariance matrix of the Gaussian function k, $^T(X-\mu_k)$ represents the transpose of the vector $(X-\mu_k)$, $A_k$ is the weighting factor of the Gaussian function k, e is the exponential function, $\pi$ is a constant equal to the ratio of the circumference of a circle to its diameter, and $$\sum_{k=1}^{p}$$

is the sum function from Gaussian function 1 to Gaussian function p.

However, a belonging criterion as defined in this way and compared with the alarm threshold Sa may generate instances of non-detection as mentioned above. The belonging criterion can be less than the alarm threshold Sa, even though at least one health indicator is greater than the corresponding threshold $Sd_i$. Consequently, this belonging criterion may lead to it being deduced that there is no fault or no risk of a fault appearing on the device, even though such a risk of a fault appearing does actually exist.

Using the belonging function f and the alarm threshold Sa without taking account of the health indicators individually can therefore give rise to instances of non-detection of faults, and is therefore less efficient than using only health indicators and individually comparing their respective detection thresholds $Sd_i$.

Furthermore, combining firstly the comparison of such a belonging criterion with the alarm threshold Sa and secondly the comparison of the health indicators with their respective detection thresholds $Sd_i$ certainly makes it possible to overcome this drawback, but can also generate a high rate of false alarms.

In order to mitigate those drawbacks, the method of the invention for merging health indicators makes it possible, during a step of taking account of the detection thresholds $Sd_i$, to determine a transformation T of the belonging function f in order to take account of the detection thresholds $Sd_i$ corresponding to the health indicators when calculating the merged health indicator MHI.

This transformation T thus makes it possible to transform the belonging function f and to determine a merged health indicator MHI making it possible to conclude accurately and effectively whether or not the monitored device presents a fault or a risk of a fault appearing.

This merged health indicator MHI is in particular different from the belonging criterion defined by the belonging function f for the zones of the healthy-state model Mr where at least one health indicator is greater than or equal to its detection threshold $Sd_i$.

Conversely, this transformation T does not act on the belonging function f for the zones of the healthy-state model Mr where each health indicator is below its detection threshold $Sd_i$. The merged health indicator MHI is thus equal to the belonging criterion.

In addition, when, for the healthy-state model Mr in its entirety, each health indicator is below its detection threshold $Sd_i$, the transformation T is an identity function that does not modify the belonging function f, and the merged health indicator MHI is always equal to said belonging criterion.

Consequently, the transformation T acts on the belonging function f by incorporating the detection thresholds $Sd_i$ for calculating the merged health indicator MHI only in the zones where that is necessary.

However, this transformation T does not just substitute an alarm threshold Sa with a detection threshold $Sd_i$ of a health indicator when a health indicator crosses its detection threshold $Sd_i$, which would correspond to removing from the healthy-state model Mr those zones for which at least the detection threshold $Sd_i$ is crossed by a health indicator.

This transformation T as applied to the belonging function f makes it possible to calculate the merged health indicator MHI as a function of the belonging criterion, of the health indicators $Ind_i$, of the detection thresholds $Sd_i$, and of the alarm threshold Sa. Advantageously, this merged health indicator MHI has behavior that is regular, with variation that is close to that of the belonging criterion determined by the belonging function f. In this manner, said transformation T guarantees that if at least one health indicator is greater than or equal to its detection threshold $Sd_i$, the merged health indicator MHI is also greater than or equal to the alarm threshold Sa. The presence of a fault or a risk of a fault appearing is thus detected, even if the corresponding belonging criterion is below the alarm threshold Sa. The merged health indicator MHI thus makes it possible to have behavior that is consistent with the health indicators that make it up.

Thus, if a characteristic operating point Pf corresponds to a belonging criterion that is less than or equal to the alarm threshold Sa, i.e. if said characteristic operating point Pf is located inside the boundary of the healthy-state model Mr, and if the belonging criteria corresponding to the detection thresholds $Sd_i$ in a sufficiently large neighborhood of said characteristic operating point Pf are greater than the alarm threshold Sa, then the merged health indicator MHI is equal to the belonging criterion.

Consequently, in order to ensure continuity in calculation of the merged health indicator MHI by the transformation T that is applied to the belonging function f, the merged health indicator MHI is equal to the belonging criterion for all characteristic operating points Pf that are located between the center of the healthy-state model Mr and a limit characteristic operating point for which the belonging criterion is equal to the alarm threshold Sa and for which each health indicator $Ind_i$ is lower than its detection threshold $Sd_i$.

Likewise, if the belonging criterion of a characteristic operating point Pf is less than or equal to the alarm threshold Sa and if the belonging criterion corresponding to at least one detection threshold $Sd_i$ in a sufficiently large neighborhood of said characteristic operating point Pf is less than or equal to the alarm threshold Sa, then the merged health indicator MHI is proportional to the belonging criterion. A multiplier coefficient is applied to the belonging criterion and is equal to the ratio between the alarm threshold Sa and a belonging criterion corresponding to said detection threshold $Sd_i$. The merged health indicator MHI is thus greater than or equal to the alarm threshold Sa and corresponds to the presence of a fault or the risk of a fault appearing. In particular, if a health indicator $Ind_i$ is equal to its detection threshold $Sd_i$, the merged health indicator MHI is then equal to the alarm threshold Sa.

In addition, in order to ensure continuity in calculation of the indicator MHI, the merged health indicator MHI is proportional to the belonging criterion for any characteristic operating point Pf that is located between the center of the healthy-state model Mr and a characteristic operating point for which the belonging criterion is below the alarm threshold Sa and for which at least one health indicator $Ind_i$ is equal to or greater than its detection threshold $Sd_i$, with the multiplier coefficient that is applied being equal to the ratio between the alarm threshold Sa and a belonging criterion corresponding to said detection threshold $Sd_i$.

By way of example, for a healthy-state model Mr that is a multidimensional Gaussian function represented in the health indicator space, the criterion for determining fault detection is said alarm threshold Sa for any characteristic operating point Pf that is located on a line passing through the center of said healthy-state model Mr and a characteristic operating point located on the boundary of said healthy-state model Mr, i.e. for which the belonging criterion, which may be the Mahalanobis distance, is equal to the alarm threshold Sa and for which the belonging criterion corresponding to each detection threshold $Sd_i$ is greater than said alarm threshold Sa. The merged health indicator MHI is thus equal to the belonging criterion.

However, for the same healthy-state model Mr, the criterion for determining fault detection is the detection threshold $Sd_i$ for any characteristic operating point Pf that is located on a line passing through the center of said healthy-state model Mr and a characteristic operating point located on the boundary of said healthy-state model Mr and for which the belonging criterion corresponding to that detection threshold $Sd_i$ is less than or equal to said alarm threshold Sa. The merged health indicator MHI is thus proportional to the belonging criterion, the multiplier coefficient applied to the belonging criterion being equal to the ratio between the alarm threshold Sa and the belonging criterion corresponding to said detection threshold $Sd_i$.

Furthermore, additional conditions may be satisfied by the transformation T, in particular so that its behavior when it is applied to the belonging function f is as close as possible to the behavior of the belonging function f. Thus, the transformation T must be representative of the belonging function f in order to determine effectively and accurately whether a fault is present or whether there is a risk of a fault appearing on the device or the group of monitored devices. These additional conditions depend on the characteristics of the healthy-state model Mr and of the belonging function f and also on the type of modeling used to define the healthy-state model Mr.

A first additional condition is that the transformation T applied to the belonging function f is continuous if the belonging function f is continuous.

In a second additional condition, each partial derivative of order q of the transformation T applied to the belonging function f must be bounded over its definition domain, q being a positive integer. This second additional condition guarantees that the transformation T applied to the belonging function f and each of its derivatives of order (q−1) does not involve a steep jump, nor a sudden variation or change of slope. Indeed, such a steep jump or such a change of slope may be compared to the presence of a fault on the merged health indicator MHI and could thus lead to a false alarm being activated.

In a third additional condition, when the belonging function f is of class $C^q$, then the transformation T applied to the belonging function f is at least of class $C^m$, with m selected between 1 and q, m and q being positive integers, and m being less than or equal to q. A function is of class $C^q$ when said function can be differentiated q times and its derivatives are continuous.

In addition, in a fourth additional condition, when the belonging function f can be differentiated q times, then the transformation T applied to the belonging function F can also be differentiated q times, q being a positive integer.

In a fifth additional condition, the difference between the transformation T applied to the belonging function f and said belonging function f is minimized so that said transformation T has behavior that is as similar as possible to that of the belonging function f. An example of a variation criterion used to determine the transformation T is the least squares method.

In addition, in a sixth additional condition, the difference between the partial derivatives of order q of the transformation T and the partial derivatives of order q of said belonging function f are minimized, q being a positive integer.

These various additional conditions advantageously enable the variation of the merged health indicator MHI to be as closely representative as possible of the reality of the variations in characteristics of the monitored device and in particular of characteristic operating points Pf. In particular, any change in the variability of the merged health indicator MHI or its slope or of the variability of its slope must be consistent and correspond to equivalent changes in the characteristics of the monitored device and in particular of characteristic operating points Pf.

Advantageously, the transformation T makes it possible to determine the merged health indicator MHI firstly by taking account of the correlation between the set of health indicators, thus improving fault detection and secondly by incorporating safeguards concerning the absolute levels constituted by the health indicators. Consequently, the merging method of the invention makes it possible to avoid monitoring said health indicators individually, while guaranteeing performance that is no worse than individually monitoring the health indicators, and while making it possible to improve fault detection performance. The term "no worse" refers to fault detection efficiency that is at least equal to individually monitoring the health indicators, the merging method making it possible to detect at least all of the faults that would be detected by individually monitoring the health indicators.

The present invention also provides a system for merging health indicators of a device in order to implement the above-described merging method.

Sensors are positioned on said device and/or close to said device to be monitored. Such a system for merging health indicators thus comprises:
- centralization means provided with at least one central computer and at least one main memory;
- an acquisition system for acquiring measurements from said sensors; and
- at least one transfer means for transfer between said acquisition system and said centralization means.

Said system for merging health indicators of a device is thus able to implement the above-mentioned method of merging health indicators.

Initially, the main memory makes it possible in particular to store the distribution of the health indicators $Ind_i$ in each indicator group and their respective detection thresholds $Sd_i$ as well as algorithms g for calculating characteristic operating points Pf using the health indicators $Ind_i$ of each indicator group.

In addition, the transfer means make it possible to transfer measurements, which measurements were performed by the acquisition system, from the sensors to the centralization means, the central computer of the centralization means thus calculating the corresponding health indicators $Ind_i$.

However, the acquisition system may also comprise an acquisition computer and an auxiliary memory in order to calculate and store the health indicators $Ind_i$.

In addition, the acquisition system and the centralization means may be grouped together to form a single unit.

During a training step, training operating points of the device may thus be calculated by the central computer for each indicator group and may be stored in the main memory by applying a predefined algorithm g specific to said indicator group to the training health indicators.

Then, said training operating points are used, for the indicator group, to determine: a healthy-state model Mr for the device together with a belonging function f indicating whether a characteristic operating point Pf of said device belongs to said healthy-state model Mr for the device, and also an alarm threshold Sa associated with the healthy-state model.

During a step of taking the detection thresholds $Sd_i$ into account, the central computer also makes it possible to determine a transformation T for transforming the belonging function f so as to take account firstly both of the alarm threshold Sa of the healthy-state model Mr and also of the detection thresholds $Sd_i$ of the health indicators $Ind_i$ of the indicator group.

Thereafter, using the health indicators $Ind_i$ determined by the central computer as a function of sensor measurements performed by the acquisition system, the central computer applies the transformation T of the belonging function f to the health indicators $Ind_i$ of the indicator group in order to determine a merged health indicator MHI.

Finally, the central computer compares the merged health indicator MHI with the corresponding alarm threshold Sa and deduces whether or not the presence of a fault or a risk of a fault or failure has been detected on the supervised device.

BRIEF DESCRIPTION OF THE SEVERAL VIEWS OF THE DRAWINGS

The invention and its advantages appear in more detail from the following description of embodiments given by way of illustration and with reference to the accompanying figures, in which:

FIG. 1 is a block diagram of the method of the invention for merging health indicators;

FIG. 2 shows a rotary wing aircraft provided with a system of the invention for merging health indicators relating to a device;

FIGS. 3 to 5 are three graphs showing respective healthy-state models Mr for the device in a healthy state; and FIG. 6 shows two graphs showing a belonging function f and a transformation T of said belonging function f, together with a probability density.

Elements that are present in more than one of the figures are given the same references in each of them.

DETAILED DESCRIPTION OF THE INVENTION

FIG. 1 shows the block diagram of a method of merging health indicators relating to a device 3, 4, the method comprising nine main steps. The method makes it possible to monitor the device 3, 4, and more particularly its operation, in effective and reliable manner.

FIG. 2 shows a rotary wing aircraft 1 provided with a system 5 for merging health indicators relating to devices 3, 4, the merging system 5 being capable of implementing the merging method shown in FIG. 1.

This aircraft 1 includes at least one fuel-burning engine 3 driving a mechanical power transmission mechanism 4, such as a main gearbox (MGB), that drives rotation of a main rotor 2 of the aircraft 1.

This aircraft 1 includes three sensors 101, 102, and 103, associated respectively with the main rotor 2, with the mechanical power transmission mechanism 4, and with the engine 3. These sensors 101, 102, and 103 make it possible to monitor the engine 3, the mechanical power transmission mechanism 4, and the main rotor 2. Any of said engine 3, said mechanical power transmission mechanism 4, and the main rotor 2 may be referred to in the description below by the general term "device".

Said merging system 5 comprises centralizing means 120 provided with a central computer 121 and main memory 122 as well as with a measurement acquisition system 110. This measurement acquisition system 110 may comprise an acquisition computer 111 and an auxiliary memory 112. This merging system 5 further comprises transfer means 130 making it possible to transfer data between the acquisition system 110 and the centralization means 120.

Health indicators $Ind_i$ for monitoring the devices 3, 4 may be calculated using measurements from the sensors 101, 102, 103. A health indicator $Ind_1$, $Ind_2$, $Ind_3$ may thus be calculated using measurements from a respective single sensor 101, 102, 103. An additional health indicator $Ind_4$ may also be calculated using measurements from a plurality of sensors, e.g. from measurements of the two sensors 101 and 102. Thus, the first health indicator $Ind_1$ is in particular designed for monitoring the main rotor 2, the second health indicator $Ind_2$ is in particular designed for monitoring the mechanical power transmission mechanism 4, and the third health indicator $Ind_3$ is in particular designed for monitoring the engine 3. In addition, the fourth health indicator $Ind_4$ may enable both the main rotor 2 and the mechanical power transmission mechanism 4 to be monitored, together with the connection between them.

These health indicators $Ind_1$, $Ind_2$, $Ind_3$, $Ind_4$ of the devices 3, 4 may be calculated by means of the acquisition computer 111, while each device 3, 4 is in operation and while the aircraft is in flight. These indicators $Ind_1$, $Ind_2$, $Ind_3$, $Ind_4$ may be stored temporarily in the auxiliary memory 112 of the acquisition system 110 while the aircraft 1 is in flight.

However, these health indicators $Ind_1$, $Ind_2$, $Ind_3$, $Ind_4$ may also be calculated by means of the central computer 121, the sensor measurements 101, 102, 103 thus being transferred from the acquisition means 110 to the centralization means 120 by the transfer means 130. This transfer and this calculation may take place while the aircraft 1 is in flight or else after a flight of said aircraft 1.

Furthermore, if the health indicators are calculated on the ground after a flight of the aircraft 1, the centralization means 120 may then be located outside the aircraft 1, e.g. in a platform on the ground.

Each health indicator $Ind_1$, $Ind_2$, $Ind_3$, $Ind_4$ may be compared to a respective threshold $Sd_1$, $Sd_2$, $Sd_3$, $Sd_4$ for detecting faults associated with the health indicator $Ind_1$, $Ind_2$, $Ind_3$, $Ind_4$ so as to detect the presence of a fault or a risk of such a fault appearing on the device 3, 4. This detection threshold $Sd_1$, $Sd_2$, $Sd_3$, $Sd_4$ may be a maximum threshold or a minimum threshold, or even a double threshold made up of a lower limit and an upper limit, thus constituting a range.

This fault-detecting threshold $Sd_1$, $Sd_2$, $Sd_3$, $Sd_4$ is generally constant, but it may vary with various parameters such as time. This detection threshold $Sd_1$, $Sd_2$, $Sd_3$, $Sd_4$ may thus be a threshold learned by training, or else it may be a moving threshold.

This fault detection threshold $Sd_1$, $Sd_2$, $Sd_3$, $Sd_4$ may also vary, depending on at least one other health indicator of the monitored devices 3, 4.

These health indicators $Ind_1$, $Ind_2$, $Ind_3$, $Ind_4$ together with the detection thresholds $Sd_1$, $Sd_2$, $Sd_3$, $Sd_4$ may be stored in the main memory 122.

During a preliminary step 10 of the merging method of the invention, the health indicators $Ind_1$, $Ind_2$, $Ind_3$, $Ind_4$ of each device 3, 4 are allocated to at least one indicator group $G_1$, $G_2$, each indicator group $G_1$, $G_2$ being designed for monitoring a single device 3, 4. By way of example, a first indicator group $G_1$ comprises three health indicators $Ind_1$, $Ind_2$, $Ind_4$ and is associated with monitoring the mechanical power transmission mechanism 4, while a second indicator group $G_2$ includes the single health indicator $Ind_3$ and is associated with monitoring the engine 3.

During a training step 20 of training the merging method of the invention, there are determined from the operating points used in training: a healthy-state model Mr for each device 3, 4; a belonging function f indicating whether a characteristic operating point Pf of each device 3, 4 belongs to the healthy-state model Mr of said device 3, 4; and an alarm threshold Sa associated with the belonging function f. This training step 20 may be broken down into a plurality of substeps 21 to 25.

During the first substep 21, training health indicators are determined for each indicator group $G_1$, $G_2$ for a healthy device 3, 4. In order to determine these training health indicators, the acquisition system 110 acquires measurements from various sensors 101, 102, 103 on a healthy device 3, 4. Then, the training health indicators that correspond respectively to the health indicators $Ind_1$, $Ind_2$, $Ind_3$, $Ind_4$ are calculated as a function of the measurements from the various sensors 101, 102, 103.

During the second substep 22, training operating points are determined for each device 3, 4 by applying to each indicator group $G_1$, $G_2$ a predefined algorithm g specific to the training health indicators for each indicator group $G_1$, $G_2$. The training operating points form one or more "clouds" of points that are characteristic of the healthy state of each device 3, 4 relative to an indicator group $G_1$, $G_2$. The algorithms that are predefined and specific to each indicator group $G_1$, $G_2$ may be stored in the main memory 122.

The set of training health indicators for each device 3, 4 may be conserved in the main memory 122 of the centralization means 120 together with the training operating points for each device 3, 4.

Examples of such clouds of training operating points concerning the first indicator group $G_1$ and, consequently, concerning the mechanical power transmission mechanism 4 are shown in FIGS. 3 to 5. Said FIGS. 3 to 5 are graphs with the values of the first health indicator $Ind_1$ plotted along the abscissa axis and the values of the second health indicator $Ind_2$ plotted up the ordinate axis. In FIGS. 4 and 5, the training operating points form a single cloud of points, while in FIG. 3, the training operating points form two distinct clouds of points.

Said FIGS. 3 to 5 also show the detection thresholds $Sd_1$, $Sd_2$ corresponding respectively to the health indicators $Ind_1$, $Ind_2$. It should be observed that the detection thresholds $Sd_1$, $Sd_2$ are constant in FIG. 3. However, in FIG. 5, the second detection threshold $Sd_2$ is also constant, whereas the first detection threshold $Sd_1$ varies as a function of the values of the second health indicator $Ind_2$. The detection thresholds $Sd_1$, $Sd_2$ shown in said FIGS. 3 and 5 are maximum detection thresholds.

In addition, in FIG. 4, the thresholds $Sd_1$, $Sd_2$ are represented by an envelope $Sd_{1,2}$ that varies as a function of the health indicators $Ind_1$, $Ind_2$. Said envelope $Sd_{1,2}$ is formed by a succession of minimum and maximum detection threshold pairs $Sd_1$, $Sd_2$ respectively as a function of the other detection threshold $Sd_2$, $Sd_1$. By way of example, for a first health indicator $Ind_1$ having a value of zero, the envelope $Sd_{1,2}$ is formed by a second minimum detection threshold $Sd_{2m}$ and by a second maximum detection threshold $Sd_{2M}$. The envelope $Sd_{1,2}$ thus constitutes a range, the presence of a fault thus being detected when the health indicator $Ind_1$, $Ind_2$ is located outside the range.

During the third substep 23, a healthy-state model Mr for each device 3, 4 for each indicator group $G_1$, $G_2$ is determined using the training operating points for each device 3, 4. For FIGS. 4 and 5, in which the training operating points form a single cloud of points, said cloud may be modeled by a single multidimensional Gaussian function 7, which then constitutes the healthy-state model Mr of the healthy state of the mechanical power transmission mechanism 4. However, in FIG. 3, two distinct clouds of points are shown. Thus, a single multidimensional Gaussian function does not suffice for modeling the set of said training operating points. The healthy-state model Mr for the mechanical power transmission mechanism 4 is thus formed by a superposition of multidimensional Gaussian functions 8, 8'; each multidimensional Gaussian function 8, 8' corresponds respectively to one of the two clouds of training operating points. Either way, the multidimensional Gaussian functions 7, 8, 8' have numbers of dimensions that are equal to the numbers of health indicators $Ind_1$, $Ind_2$, $Ind_4$ forming the indicator group $G_1$, i.e. three in this example concerning the mechanical power transmission mechanism 4. In addition, these three-dimensional Gaussian functions 7, 8, 8' are represented by ellipses in a two-dimensional space such as in the graphs of FIGS. 3, 4, and 5.

During the fourth substep 24, a belonging function f is determined indicating whether a characteristic operating point Pf of each device 3, 4 belongs to the healthy-state model Mr for said device 3, 4 based on said training operating points. This belonging function f applied to the health indicators $Ind_1$, $Ind_2$, $Ind_4$ forming the indicator group $G_1$ makes it possible to define a belonging criterion to the healthy-state model Mr for any characteristic operating point Pf. This belonging criterion may be a positioning criterion concerning the position of said characteristic operating point Pf relative to the healthy-state model Mr, and more precisely a distance D between said characteristic operating point Pf and the center O of said healthy-state model Mr.

By way of example, this belonging criterion is the Mahalanobis distance, which is particularly appropriate when the healthy-state model Mr is modeled by a single multidimensional Gaussian function. The belonging function f is thus a function for determining said Mahalanobis distance.

This belonging criterion may also be a function of the probability density of the healthy-state model Mr, whether it has been modeled by one Gaussian function or by superposition of multidimensional Gaussian functions. Indeed, a known bijection (one-to-one correspondence) exists between the Mahalanobis distance and the probability density for any Gaussian function or any superposition of Gaussian functions. Consequently, a correlation exists between the probability density of each multidimensional Gaussian function and the Mahalanobis distance associated with said multidimensional Gaussian function. It is therefore possible to define the belonging function f that is thus a function of said probability density.

The belonging criterion of a characteristic operating point Pf of a device 3, 4 is thus determined by applying the belonging function f to the health indicators $Ind_1$, $Ind_2$, $Ind_3$, $Ind_4$ of the indicator group $G_1$, $G_2$ corresponding to said characteristic operating point Pf.

During the fifth substep 25, an alarm threshold Sa is determined that is associated with each belonging function f, this alarm threshold Sa being equal to the belonging criterion of a limit characteristic operating point located on the boundary of the healthy-state model Mr for said device 3, 4. This alarm threshold Sa may then be compared to the belonging criterion for any characteristic operating point Pf of a device 3, 4 so as to determine the position of said characteristic operating point Pf relative to the boundary of said healthy-state model Mr and, consequently, whether there is a fault present on the device 3, 4, or a risk of a fault appearing. This alarm threshold Sa may be a maximum threshold, or a minimum threshold, or even a double threshold made up of a lower limit and an upper limit, thus constituting a range. This alarm threshold Sa may also be a threshold learned by training, or it may be a moving threshold.

The healthy-state models Mr for each device 3, 4, and also each belonging function f, and each associated alarm threshold Sa, may all be stored in the main memory 122 of the centralization means 120.

However, although the use of such a healthy-state model Mr for a device 3, 4 makes it possible to take account of a correlation between the health indicators $Ind_i$, it may also lead to inconsistencies between the belonging criterion and the detection thresholds $Sd_i$.

In FIG. 3, the two Gaussian functions 8, 8' forming the healthy-state model Mr are located entirely below the two detection thresholds $Sd_1$, $Sd_2$. Consequently, a characteristic operating point A having its belonging criterion below an alarm threshold Sa (this characteristic operating point A being located within the model Mr), is derived from health indicators $Ind_1$, $Ind_2$, $Ind_4$ that also comply with the two detection thresholds $Sd_1$, $Sd_2$. There are therefore no inconsistencies between this healthy-state model Mr and the two detection thresholds $Sd_1$, $Sd_2$.

However, in FIG. 4 and in FIG. 5, the Gaussian function 7 forming the healthy-state model Mr is on both sides of the two detection thresholds $Sd_1$, $Sd_2$. Consequently, two characteristic operating points B, C having belonging criteria that are below the alarm threshold Sa (these characteristic operating points B, C being situated within their respective healthy-state models Mr) are derived from health indicators $Ind_1$, $Ind_2$, $Ind_4$ that do not comply with the detection threshold $Sd_2$ for the characteristic operating point B, or the two detection thresholds $Sd_2$ for the characteristic operating point C, said characteristic operating point C being situated outside the envelope $Sd_{1,2}$. In this event, the belonging criteria corresponding to these characteristic operating points B, C make it possible to conclude that the mechanical power transmission mechanism 4 is healthy, whereas comparing the health indicators $Ind_1$, $Ind_2$ individually with the detection thresholds $Sd_1$, $Sd_2$ indicates the presence of a fault. There are therefore inconsistencies between this healthy-state model Mr and the two detection thresholds $Sd_1$, $Sd_2$.

During a step of taking account of the detection thresholds 30 in the merging method of the invention, a transformation T is determined for transforming said belonging function f so as to take into account both the alarm threshold Sa of the healthy-state model Mr and also the detection thresholds $Sd_i$ of the health indicators $Ind_i$ of the indicator group $G_1$, $G_2$.

This transformation T makes it possible to avoid inconsistencies between the healthy-state model Mr and the detection thresholds $Sd_i$, and to determine a merged health indicator MHI making it possible to conclude accurately and efficiently as to whether the monitored device 3, 4 presents a fault or indeed a risk of a fault appearing.

During a monitoring step 40 of the merging method of the invention, an operating state of the monitored device 3, 4 is deduced from the health indicators $Ind_1$, $Ind_2$, $Ind_3$, $Ind_4$ for an indicator group $G_1$, $G_2$. This monitoring step 40 may be broken down into a plurality of substeps 41 to 44.

During the first substep 41, health indicators $Ind_1$, $Ind_2$, $Ind_3$, $Ind_4$ are determined for an indicator group $G_1$, $G_2$. In order to determine these health indicators $Ind_1$, $Ind_2$, $Ind_3$, $Ind_4$, measurements from various sensors 101, 102, 103 are acquired by means of the acquisition system 110, and then the health indicators $Ind_2$, $Ind_3$, $Ind_4$ are calculated as a function of these measurements from the various sensors 101, 102, 103.

During the second substep 42, a merged health indicator MHI is determined by applying the transformation T of said belonging function f to these health indicators $Ind_1$, $Ind_2$, $Ind_3$, $Ind_4$ for an indicator group $G_1$, $G_2$ of a device 3, 4. This merged health indicator MHI is determined for an indicator group $G_1$, $G_2$ by taking account of the alarm threshold Sa and the detection thresholds $Sd_1$, $Sd_2$.

This merged health indicator MHI may be equal to or different from the belonging criterion defined by the belonging function f depending on the position of the healthy-state model Mr relative to the detection thresholds $Sd_1$, $Sd_1$, $Sd_3$, $Sd_4$ corresponding to the health indicators $Ind_1$, $Ind_2$, $Ind_3$, $Ind_4$.

By way of example, when the entire healthy-state model Mr is situated below all of the detection thresholds $Sd_i$, as shown in FIG. 3, the transformation T is an identity function that does not modify the belonging function f and the merged health indicator MHI is thus equal to said belonging criterion, with no inconsistencies existing between this healthy-state model Mr and the detection thresholds $Sd_i$.

Conversely, when the healthy-state model Mr intersects at least one detection threshold $Sd_1$, $Sd_2$, as shown in FIGS. 4 and 5, the transformation T acts on the belonging function f by incorporating these detection thresholds $Sd_1$, $Sd_2$ in order to calculate the merged health indicator MHI. This transformation T is only necessary in the zones of inconsistency between the alarm threshold Sa and at least one detection threshold $Sd_1$, $Sd_2$, the transformation T having no effect in the other zones of the healthy-state model Mr. The term "zone of inconsistency" between the alarm threshold Sa and at least one detection threshold $Sd_i$ refers to any zone for which a characteristic operating point having the belonging criterion that is less than or equal to the alarm threshold Sa is produced by at least one health indicator $Ind_i$ being greater than or equal to its detection threshold $Sd_i$.

By way of example, since the belonging criterion is a distance between the center O of the healthy-state model Mr and each characteristic operating point $Pf_1$, $Pf_2$ shown in FIG. 5, such as the Mahalanobis distance, the methods of calculating the merged health indicators MHI corresponding to the two characteristic operating points $Pf_1$, $Pf_2$ are different. The belonging criteria of these two characteristic operating points $Pf_1$, $Pf_2$ are respectively the Mahalanobis distances $DM_1$, $DM_2$.

The intersection between firstly a first straight line $Z_1$ passing through the center O of the healthy-state model Mr and a first characteristic operating point $Pf_1$ and secondly the boundary of the healthy-state model Mr constitutes a point $P_{Mr1}$. The Mahalanobis distance $DM_{PMr1}$ of said point $P_{Mr1}$ is the first alarm threshold $Sa_1$. The intersection between said first straight line $Z_1$ and the first detection threshold $Sd_1$ constitutes a point $P_{Sd1}$. The Mahalanobis distance $DM_{PMr1}$ is less than the Mahalanobis distance $DM_{PSd1}$ of said point $P_{Sd1}$ corresponding to the first detection threshold $Sd_1$. Consequently, the belonging criterion of a first characteristic operating point $Pf_1$ situated on the first straight line $Z_1$, which is the Mahalanobis distance $D_{M1}$, may be equal to the first alarm threshold $Sa_1$ while being less than the Mahalanobis distance $DM_{PSd1}$ of said point $P_{Sd1}$ corresponding to the first detection threshold $Sd_1$. Consistency is thus obtained between the first alarm threshold $Sa_1$ and the first detection threshold $Sd_1$. The merged health indicator MHI is thus equal to the belonging criterion, i.e. the Mahalanobis distance.

Consequently, for any straight line passing through the center O of the healthy-state model Mr and a characteristic operating point Pf for which the alarm threshold Sa formed by the intersection of said straight line and the boundary of the healthy-state model Mr is less than the Mahalanobis distance of a point of intersection between said straight line and each detection threshold $Sd_i$, the merged health indicator MHI is equal to the belonging criterion of this characteristic operating point Pf.

However, the intersection between a second straight line $Z_2$ passing through the center O of the healthy-state model Mr and a second characteristic operating point $Pf_2$ and the boundary of the healthy-state model Mr constitutes a point $P_{Mr2}$. The Mahalanobis distance $DM_{PMr2}$ of this point $P_{Mr2}$ is a second alarm threshold $Sa_2$. The intersection of said second straight line $Z_2$ and the second detection threshold $Sd_2$ constitutes a point $P_{Sd2}$. The Mahalanobis distance $DM_{PMr2}$ is greater than the Mahalanobis distance $DM_{PSd2}$ of said point $P_{Sd2}$ corresponding to the second detection threshold $Sd_1$. Consequently, the belonging criterion for a second characteristic operating point $Pf_2$ situated on the second straight line $Z_2$, which is the Mahalanobis distance $D_{M2}$, may be less than the second alarm threshold $Sa_2$, while being greater than or equal to the Mahalanobis distance $DM_{PSd2}$ of said point $P_{Sd2}$ corresponding to the second detection threshold $Sd_2$. There is therefore an inconsistency between the second alarm threshold $Sa_2$ and the second detection threshold $Sd_2$. When this occurs, the merged health indicator MHI must therefore not be equal to the belonging criterion in order to remove this inconsistency.

In order to preserve consistency between the alarm threshold Sa and the detection thresholds $Sd_1$, $Sd_2$, the merged health indicator MHI must be equal to the second alarm threshold $Sa_2$ when the second health indicator $Ind_2$ is equal to the second detection threshold $Sd_2$. In addition, in order to preserve continuity of the transformation T and also to avoid sudden variations and steep jumps in said transformation T, the merged health indicator MHI must not only be equal to the second alarm threshold $Sa_2$ as soon as the second health indicator $Ind_2$ is equal to the second detection threshold $Sd_2$, but the merged health indicator MHI must vary in continuous and smooth manner until it is equal to the second alarm threshold $Sa_2$ when the second health indicator $Ind_2$ is equal to the second detection threshold $Sd_2$. In addition, the merged health indicator MHI must continue varying beyond said second alarm threshold $Sa_2$. The merged health indicator MHI is preferably proportional to the belonging criterion defined by the belonging function f. By way of example, a multiplier coefficient E is applied to the belonging criterion and is equal to the ratio between the Mahalanobis distance $DM_{PMr2}$ of said point $P_{Mr2}$ corresponding to the second alarm threshold $Sa_2$ and the Mahalanobis distance $DM_{PSd2}$ of said point $P_{Sd2}$ corresponding to the second detection threshold $Sd_2$ such that:

$$E = \frac{DM_{P_{Mr2}}}{DM_{P_{Sd2}}}$$

Consequently, for any straight line passing through the center O of the healthy-state model Mr and a characteristic operating point Pf for which the alarm threshold Sa as formed by the intersection of said straight line and the boundary of the healthy-state model Mr is greater than the Mahalanobis distance of a point of intersection between said straight line and at least one detection threshold $Sd_i$, the merged health indicator MHI is then proportional to the belonging criterion, with the multiplier coefficient that is applied to the belonging criterion being equal to the ratio of the alarm threshold Sa divided by the Mahalanobis distance corresponding to said detection threshold $Sd_i$.

During the third substep 43, said merged health indicator MHI determined in this way is compared with the alarm threshold Sa.

Finally, during the fourth substep 44, an operating state for said device 3, 4 is deduced from said comparison.

In application of the initial assumption of an alarm threshold Sa that is a maximum, the device 3, 4 is considered as healthy so long as the merged health indicator MHI is less than the alarm threshold Sa. However, if this merged health indicator MHI is greater than or equal to the alarm threshold Sa, the presence of a fault or the risk of a fault appearing is detected for said device 3, 4. An alarm, e.g. a visual and/or audible alarm, may then be given to an operator and in particular to the pilot of the rotary wing aircraft 1.

FIG. 6 shows in graphic form an example of a belonging function f in correlation with a probability density d as well as a transformation T of said belonging function f. The curves showing the belonging function f and the transformation T(f) have the belonging criterion and the merged health indicator MHI respectively plotted up the ordinate axis. By way of example, for a multidimensional Gaussian function, these curves have a linear combination of previously-centered health indicators $Ind_i$ plotted along the abscissa axis. The graph shown in FIG. 6 also shows the transformation T(d) applied to the probability density d.

The curve representing the belonging function f includes two points $P_{Mr2}$ and $P_{Sd2}$. The point $P_{Mr2}$ corresponds to a characteristic operating point situated on the boundary of the healthy-state model Mr, i.e. having a belonging criterion that is equal to the alarm threshold Sa of the healthy-state model Mr. The point $P_{Sd2}$ corresponds to a characteristic operating point having a health indicator $Ind_2$ that is equal to the detection threshold $Sd_2$. It should be observed that the belonging criterion of the point $P_{Sd2}$ relative to the detection threshold $Sd_2$ is less than that of the point $P_{Mr2}$ corresponding to the alarm threshold Sa. Consequently, the merged health indicator MHI determined by the transformation T of said belonging function f must have a value equal to the alarm threshold Sa for said belonging criterion of the point $P'_{Sd2}$ relative to the detection threshold $Sd_2$. The point $P_{Mr2}$ that is located on the belonging function f is thus transformed into a point $P'_{Sd2}$ that is located on the transformation T(f) of the belonging function f. In this manner, the transformation T(f) of said belonging function f defines a merged health indicator MHI equal to the alarm threshold Sa for the point $P_{Sd2}$. The points $P_{Mr2}$, $P_{Sd2}$, $P'_{Sd2}$ are also marked on the curves of probability density d and of the transformation T(d) of the probability density d.

It is thus also possible to determine the merged health indicators MHI firstly by applying the transformation T to the probability density d and then by calculating said merged health indicators MHI by using the belonging function f applied to the previously-obtained result.

It should be observed that in FIG. 6 the differences between the transformation T(f) and the belonging function f are small so that the transformation T(f) is representative of the belonging function f and so that it is possible to determine efficiently and accurately the presence of a fault or a risk of a fault appearing on the device 3, 4. In addition, the variations of the transformation T(f) are close to those of the belonging function f and do not involve any sudden variation or steep jumps that could be likened to the presence of a fault. Furthermore, since the belonging function f is continuous, the transformation T is also continuous.

Naturally, the present invention may be subject to numerous variations regarding implementation. Although several implementations are described, it should readily be understood that it is not conceivable to identify exhaustively all possible implementations. It is naturally possible to envisage replacing any of the means described by equivalent means without going beyond the ambit of the present invention.

In particular, it is considered in the description and in the figures that the detection thresholds $Sd_i$ and the alarm threshold Sa are maximum thresholds. However, the detection thresholds $Sd_i$ and the alarm threshold Sa could also be minimum thresholds or else double thresholds each made up of a lower limit and of an upper limit, thus constituting a range. These detection thresholds $Sd_i$ and the alarm threshold Sa may also be thresholds learned by training, or else a moving threshold.

What is claimed is:

1. A method for monitoring the operation of a device, wherein measurement sensors are positioned on the device and/or in close proximity to the device to measure parameters of the device while the device is in operation, measurements of at least one of the sensors making it possible to determine at least one health indicator $Ind_i$, each health indicator $Ind_i$ being associated with a detection threshold $Sd_i$, the method comprising:

during a preliminary step, distributing the health indicators $Ind_i$ of the device in at least one indicator group G and applying an algorithm g to the health indicators $Ind_i$ of an indicator group G in order to determine a characteristic operating point Pf of the device for the indicator group G;

during a training step when the device is considered healthy, operating the device during a training period, measuring the parameters of the device using the sensors while the device is operating during the training period, using the measurements of the sensors to determine training health indicators of the indicator group G, determining training operating points of the device by applying the algorithm g to the training health indicators, and determining a healthy-state model Mr for the device using the training operating points, a belonging function f indicating whether a characteristic operating point Pf of the device belongs to the healthy-state model Mr representing the device in a healthy state for the indicator group G using the training operating points, and an alarm threshold Sa associated with the belonging function f based on the training operating points;

during a step of taking account of the detection thresholds $Sd_i$, determining a transformation T of the belonging function f so as to take into account both of the alarm threshold Sa of the healthy-state model Mr and the detection thresholds $Sd_i$ of the health indicators $Ind_i$ of the group G; and during a monitoring step the following steps are performed:

operating the device;

measuring the parameters of the device using the sensors while the device is operating;

using the measurements of the sensors to determine the health indicators $Ind_i$ of an indicator group G;

determining a merged health indicator MHI by applying the transformation T to the health indicators $Ind_i$ of an indicator group G;

comparing the merged health indicator MHI with the alarm threshold Sa;

deducing an operating state of the device based on the comparison; and providing an alarm to an operator upon the operating state of the device being deduced from the comparison to be faulty.

2. The method according to claim 1, wherein:

the alarm threshold Sa is equal to a belonging criterion of a limit operating point located on a boundary of the healthy-state model Mr, the belonging criterion being determined by applying the belonging function f to the health indicators $Ind_i$ corresponding to the limit characteristic operating point for the indicator group G.

3. The method according to claim 1, wherein, in order to determine a health indicator $Ind_i$ of the device, firstly, at least one measurement is acquired from the sensors, and then the health indicator $Ind_i$ is calculated as a function of the measurements.

4. The method according to claim 1, wherein the transformation T of the belonging function f is continuous when the belonging function f is continuous.

5. The method according to claim 1, wherein each partial derivative of order q of the transformation T is bounded over its definition domain, q being a positive integer greater than or equal to 1.

6. The method according to claim 1, wherein if the belonging function f is of class $C^q$, then the transformation T is at least of class $C^m$, m, and q being positive integers greater than or equal to 0 with m less than or equal to q, a function being of class $C^q$ when the function can be differentiated q times and its derivatives are continuous.

7. The method according to claim 1, wherein the transformation T is determined by minimizing a difference between the transformation T as applied to the belonging function f and the belonging function f.

8. The method according to claim 1, wherein the healthy-state model for the device is constituted by a multidimensional Gaussian function.

9. The method according to claim 1, wherein the healthy-state model for the device is constituted by a superposition of multidimensional Gaussian functions.

10. The method according to claim 9, wherein each multidimensional Gaussian function is associated with a weighting factor.

11. The method according to claim 1, wherein the belonging function f is a probability density function of the healthy-state model Mr for the device suitable for characterizing the position of the characteristic operating point Pf of the device relative to a boundary of the healthy-state model.

12. The method according to claim 1, wherein the belonging function f is a distance between the characteristic operating point Pf and the center of the healthy-state model Mr for the device.

13. The method according to claim 12, wherein the distance is determined by the Mahalanobis distance.

14. The method according to claim 12, wherein for any characteristic operating point Pf situated on a straight line passing through the center of the healthy-state model Mr and a limit characteristic operating point situated on the boundary of the healthy-state model Mr that is equal to the alarm threshold Sa, if the belonging criterion corresponding to each detection threshold $Sd_i$ is greater than the alarm threshold Sa, the merged health indicator MHI is equal to the belonging criterion, whereas if the belonging criterion corresponding to at least one detection threshold $Sd_i$ is less than or equal to the alarm threshold Sa, the merged health indicator MHI is proportional to the belonging criterion, a multiplier coefficient being applied to the belonging criterion, which coefficient is equal to the ratio between the alarm threshold Sa and a belonging criterion corresponding to the detection threshold $Sd_i$.

15. The method according to claim 1, wherein, for a characteristic operating point Pf having the belonging criterion less than or equal to the alarm threshold Sa and the belonging criteria corresponding to the detection thresholds $Sd_i$ in a neighborhood of the characteristic operating point Pf are greater than the alarm threshold Sa, the merged health indicator MHI is equal to the belonging criterion, whereas, if the belonging criterion corresponding to at least one of the detection thresholds $Sd_i$ in the neighborhood of the characteristic operating point Pf is less than or equal to the alarm threshold Sa, the merged health indicator MHI is proportional to the belonging criterion, a multiplier coefficient being applied to the belonging criterion, which coefficient is equal to the ratio between the alarm threshold Sa and a belonging criterion corresponding to the detection threshold $Sd_i$.

16. The method of claim 1 wherein:

the device is part of a rotary wing aircraft and is used for operating the aircraft in flight; and operating the device during the monitoring step includes operating the aircraft in flight.

17. The method of claim 16 wherein:

the device includes at least one of an engine, a transmission, and a rotor of the aircraft.

18. The method of claim 1 wherein:

providing an alarm includes providing an alarm to a pilot of the aircraft upon the operating state of the device being deduced from the comparison to be faulty.

19. A system for monitoring the operation of a device, wherein measuring sensors are positioned on the device and/or in close proximity to the device, measurements of at least one of the sensors making it possible to determine at least one health indicator $Ind_i$ of the device, each health indicator $Ind_i$ being associated with a detection threshold $Sd_i$, the system comprising:

centralization means provided with at least one central computer and at least one main memory;

an acquisition system for acquiring measurements from the sensors; and at least one transfer means for transfer between the acquisition system and the centralization means;

wherein the merging system is capable of implementing the method according to claim 1.

20. A rotary wing aircraft comprising:

a device used for operating the aircraft in flight;

a plurality of measurement sensors positioned on the device and/or in close proximity to the device to measure parameters of the device while the aircraft is in flight, measurements of at least one of the sensors making it possible to determine at least one health indicator $Ind_i$, each health indicator $Ind_i$ being associated with a detection threshold $Sd_i$; and a computer system configured to:
  during a preliminary step, distribute the health indicators $Ind_i$ of the device in at least one indicator group G and apply an algorithm g to the health indicators $Ind_i$ of an indicator group G in order to determine a characteristic operating point Pf of the device for the indicator group G;
  during a training step when the device is considered healthy, measure the parameters of the device using the sensors while the aircraft is in flight during the training period, use the measurements of the sensors to determine training health indicators of the indicator group G, determine training operating points of the device by applying the algorithm g to the training health indicators, and determine a healthy-state model Mr for the device using the training operating points, a belonging function f indicating whether a characteristic operating point Pf of the device belongs to the healthy-state model Mr representing the device in a healthy state for the indicator group G using the training operating points, and an alarm threshold Sa associated with the belonging function f based on the training operating points;
  during a step of taking account of the detection thresholds $Sd_i$, determine a transformation T of the belonging function f so as to take into account both of the alarm threshold Sa of the healthy-state model Mr and the detection thresholds $Sd_i$ of the health indicators $Ind_i$ of the group G; and
  during a monitoring step:
    measure the parameters of the device using the sensors while the aircraft is in flight;
    use the measurements of the sensors to determine the health indicators $Ind_i$ of an indicator group G;
    determine a merged health indicator MHI by applying the transformation T to the health indicators $Ind_i$ of an indicator group G;
    compare the merged health indicator MHI with the alarm threshold Sa;
    deduce an operating state of the device based on the comparison; and
    provide an alarm to a pilot of the aircraft upon the operating state of the device being deduced from the comparison to be faulty.

* * * * *